United States Patent [19]

Suhre

[11] Patent Number: 4,502,144
[45] Date of Patent: Feb. 26, 1985

[54] GAIN TUNED LASER RESONATOR

[75] Inventor: Dennis R. Suhre, Monroeville, Pa.

[73] Assignee: Westinghouse Electric Corp., Pittsburgh, Pa.

[21] Appl. No.: 387,299

[22] Filed: Jun. 10, 1982

[51] Int. Cl.³ .............................................. H01S 3/10
[52] U.S. Cl. ....................................... 372/23; 372/25; 372/97; 372/102
[58] Field of Search ....................... 372/23, 97, 25, 102

[56] References Cited

U.S. PATENT DOCUMENTS 3,969,684  7/1976  de Witte et al. ...................... 372/97
4,241,318  12/1980  Comera et al. ...................... 372/26

*Primary Examiner*—James W. Davie
*Attorney, Agent, or Firm*—M. P. Lynch

[57] ABSTRACT

Multiple wavelengths are produced from a single laser gain medium by utilizing gain saturation effects within the laser cavity. Two or more partially reflecting mirrors are coupled to a totally reflecting mirror through the laser gain medium by a grating element. The optical path lengths defined by each of the partially reflecting mirrors are varied by the positioning of the partially reflecting mirrors. This permits a lower gain line to build up first, followed by a higher gain line, which then terminates the lower gain line through gain saturation. The frequency switching times and pulse intensities of the wavelengths can be varied by varying the optical path lengths.

3 Claims, 6 Drawing Figures

GAIN TUNED LASER RESONATOR

BACKGROUND OF THE INVENTION

It is occasionally necessary to rapidly tune a laser to various lasing wavelengths. Presently such tuning is accomplished through beam steering techniques employing either a mechanical or electro-optical means. Furthermore, it is frequently useful in laser applications such as multiple photon laser pumping or spectroscopy to produce multiple laser wavelengths. Typically, the output of several lasers must be combined to achieve this objective. This often introduces alignment and timing problems between the respective laser beams.

SUMMARY OF THE INVENTION

There is described herein with reference to the accompanying drawings a novel technique in which multiple gain lines, or wavelengths, are produced and controlled with a single gain medium of a laser system. In accordance with this technique, laser frequencies are changed, without the use of external beam steering, by utilizing gain saturation effects within the laser cavity.

The optical resonator of the disclosed gain tuned laser consists of at least two separate paths of lengths $L_1$ and $L_2$, in which a grating element separates the wavelengths $\lambda_1$ and $\lambda_2$ for the appropriate paths. The temporal behavior of this system can be described as:

$$\dot{I}_1 = I_1 [\alpha_1(t) - \beta_1] \frac{C}{2L_1}$$

$$\dot{I}_2 = I_2 [\alpha_2(t) - \beta_2] \frac{C}{2L_2}$$

where $\dot{I}_1$ and $\dot{I}_2$ are the time derivatives of the intensities, $\alpha_1(t)$ and $\alpha_2(t)$ are the round trip gains of $\lambda_1$ and $\lambda_2$ and $\beta_1$ and $\beta_2$ are the round trip losses for the paths $L_1$ and $L_2$. Normally a laser will operate only on the highest gain line since it builds up first from the spontaneous intensities and drives all the other laser lines below threshold due to homogeneous gain saturation. However, by varying the path lengths $L_1$ and $L_2$ this effect can be overcome thus permitting a lower gain line to buildup first, followed by the higher gain line, which then terminates the lower gain line through gain saturation. The conditions for this occurring are:

$$[\alpha_1(t) - \beta_1] > [\alpha_2(t) - \beta_2]$$

$$\frac{[\alpha_1(t) - \beta_1]}{L_1} < \frac{[\alpha_2(t) - \beta_2]}{L_2}$$

By judiciously choosing the path lengths $L_1$ and $L_2$, the frequency switching times and pulse intensities of gain lines $\lambda_1$ and $\lambda_2$ can be varied.

In a $CO_2$ laser, for example, gain saturation effects are due to rotational relaxation which is only a few nanoseconds at higher pressures of about one atmosphere. Very short pulses are therefore obtainable and can be switched on the same time scales. This technique provides a very rapid frequency slewing rate, and thus has potential applications in radar and laser photochemistry.

While the above-simplified description is limited to two frequencies, it is possible to obtain many frequencies by simply adding more paths L to the optical resonator and adjusting the path lengths.

DESCRIPTION OF THE DRAWINGS

The invention will become readily apparent in connection with the accompanying drawings.

DESCRIPTION OF THE PREFERRED EMBODIMENT

Figure 1:
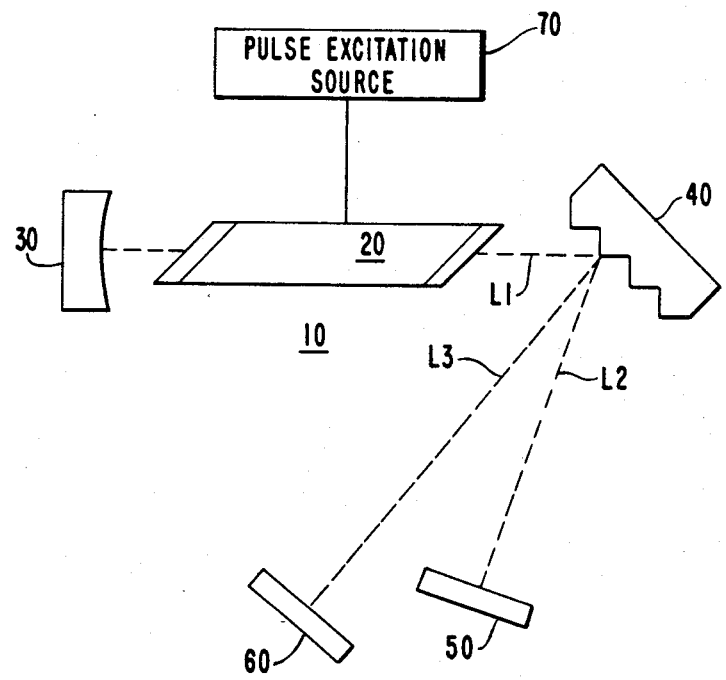
FIG. 1 is a schematic illustration of a gain tuned laser resonator employing the invention.

Referring to FIG. 1, there is schematically illustrated a multiple wavelength laser system 10 comprising a single laser gas gain medium assembly 20 supporting multiple laser optical cavities as defined by the mirrors 30, 50 and 60, and the grating element 40. The laser gain medium assembly 20, which may be implemented through the use of a $CO_2$, dye, excimer, etc. laser, is operated in a pulsed mode and responds to the electrical excitation from a pulse excitation source 70. The positioning of the partially reflecting mirrors 50 and 60 with respect to the grating 40 and totally reflecting mirror 30 produces two optical cavities employing the single gain medium of the laser apparatus 20. The first optical cavity consists of the combination of the optical path lengths $L_1$ and $L_2$, while the second optical cavity corresponds to the optical path lengths $L_1$ and $L_3$. The grating element 40 performs a task of separating the two wavelengths $\lambda_1$ and $\lambda_2$ corresponding to the positioning of the mirrors 50 and 60, respectively. The pulse time between the two wavelengths extracted from the single laser gas medium 20 can be varied by changing the distance of the mirrors 50 and 60 with respect to the grating element 40 thereby increasing or decreasing the path lengths $L_2$ and $L_3$, respectively. Similarly, the ratio of the energy output between the wavelengths $\lambda_1$ and $80_2$ can also be varied by changing the path lengths $L_2$ and $L_3$ through the positioning of the mirrors 50 and 60 with respect to the grating element 40. Thus what is described above, is an arrangement employing a single laser gas medium in combination with suitably positioned mirror elements and a grating element to obtain two gain lines, or wavelengths, from a single gas medium of a pulsed gas laser assembly wherein the spacing of the pulses of the wavelengths, as well as the ratio of the energy output of the wavelengths, can be varied by varying the optical cavities associated with the respective wavelengths through the positioning of the mirror elements.

This technique for varying the temporal spacing of pulses at different wavelengths from a single laser gain medium by varying the lengths of the optical cavities associated with the respective wavelengths provides a technique for developing timing between pulses which does not require the traditional use of a second laser apparatus.

While the above technique has been demonstrated with respect to obtaining two wavelengths from a single laser gas medium, it is apparent that through the use of additional optics positioned with respect to the grating element 40 additional wavelengths can be obtained from the same single laser gain medium 20 of the laser apparatus 10.

The experimental verification of the above technique for producing multiple wavelengths from a laser consisting of multiple cavities and a single gain medium was obtained through the use of a CO₂ laser gain medium wherein the P(14) and P(18) transitions, i.e. wavelengths, of the 10 micron band of $CO_2$ were produced, and subsequently controlled by varying the individual cavity lengths. The laser gain medium was produced by a UV-preionized discharge in a 3:3:4, $CO_2:N_2:He$ mixture at 3:50 Torr and 300° K.

Figure 2:
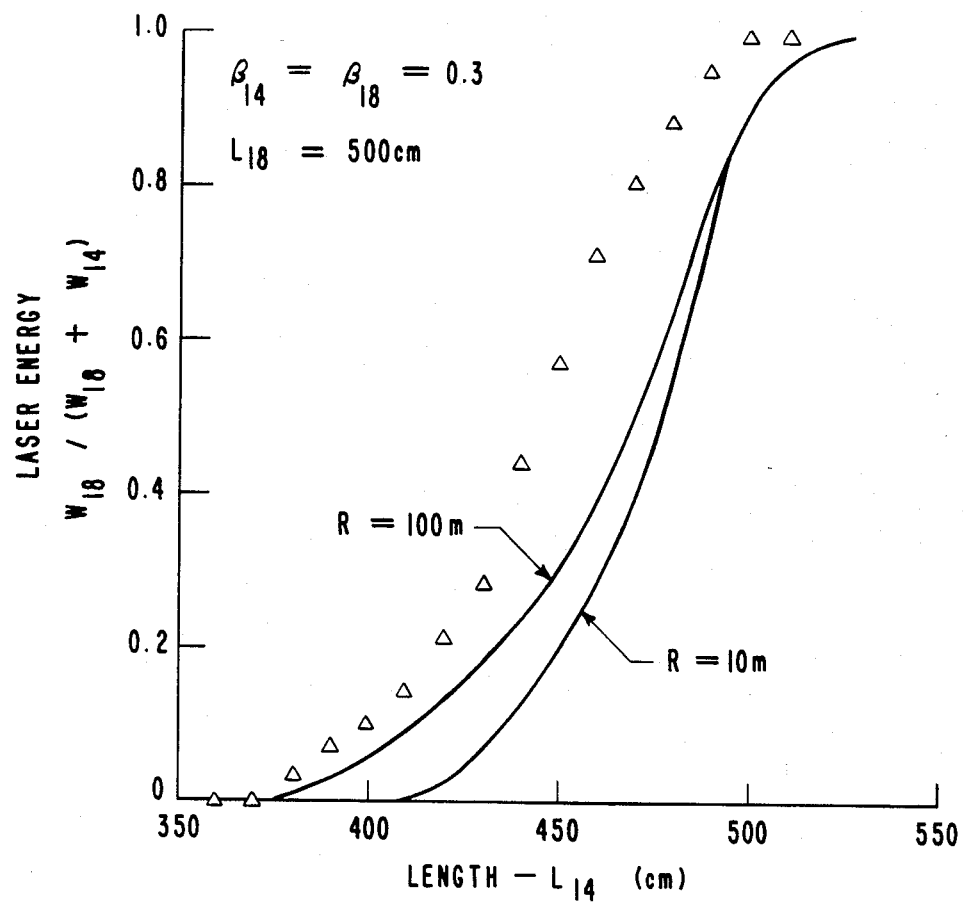
FIGS. 2–6 are graphical illustrations of the operation of the embodiment of FIG. 1.

Referring to FIG. 2, there is an illustrated a direct comparison of the theoretical calculations and the experimental data obtained. The calculated, theoretical information was developed under the the assumption that the round trip losses $\beta_{18}$ and $\beta_{14}$ associated with the wavelengths $P_{14}$ and $P_{18}$ were identical and equal to 0.3. Furthermore, the path length of the optical cavity $L_1 + L_3$ associated with the wavelength P(14) was set at 500 centimeters and a spherical mirror having a radius R of 10 meters was employed as mirror 30. With the fixed values of $\beta_{14}$, $\beta_{18}$, and the length of the optical path associated with the wavelength P(18) corresponding to experimental parameters, the energy ratio between the two pulses of the wavelengths P(14) and P(18) was calculated as a function of an optical cavity length ($L_1 + L_2$) associated with the wavelength P(14) for two different spherical mirror curvatures R, namely, 10 meters and 100 meters. It can be seen from the graphical illustration of FIG. 2 that the mirror radius has very little effect on the results and that a simpler plane wave calculation would suffice to illustrate the technique. As the mirror 50 is moved closer to the grating element 40 and the length of the optical cavity for the P(14) wavelength decreases, more of the energy is channeled into the P(14) pulse. This is supported by the experimental data points obtained with the spherical mirror 30 having a radius of curvature of 10 meters. Identical output couplers, i.e., mirrors 50 and 60, were used so that an equal fraction of the laser energy was measured for both paths. The energy ratios can then be directly compared to the theoretical calculations. There is close agreement between the theoretical and experimental results shown in FIG. 2.

Figure 3:
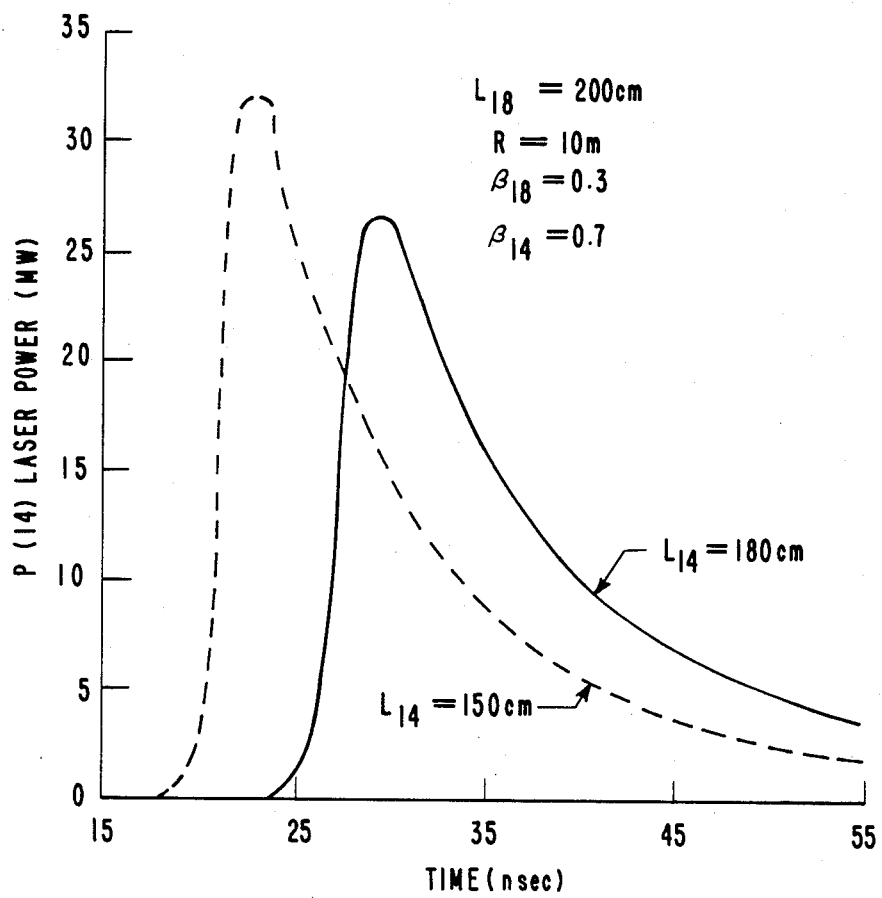
Figure 4:
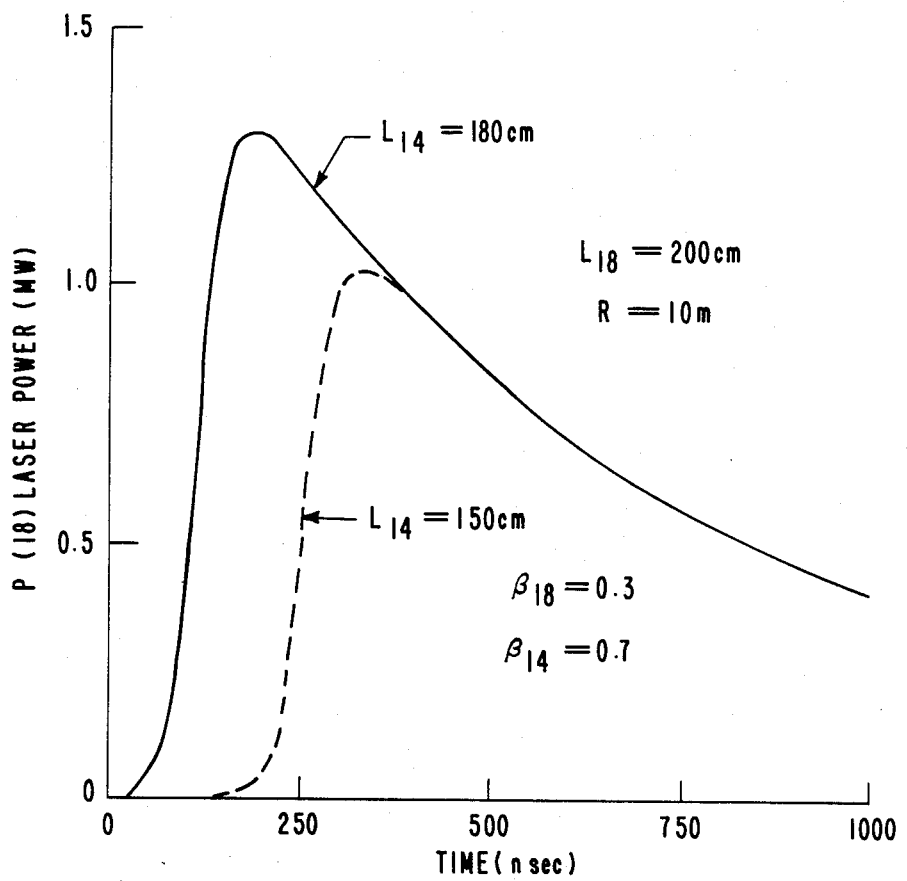
Figure 5:
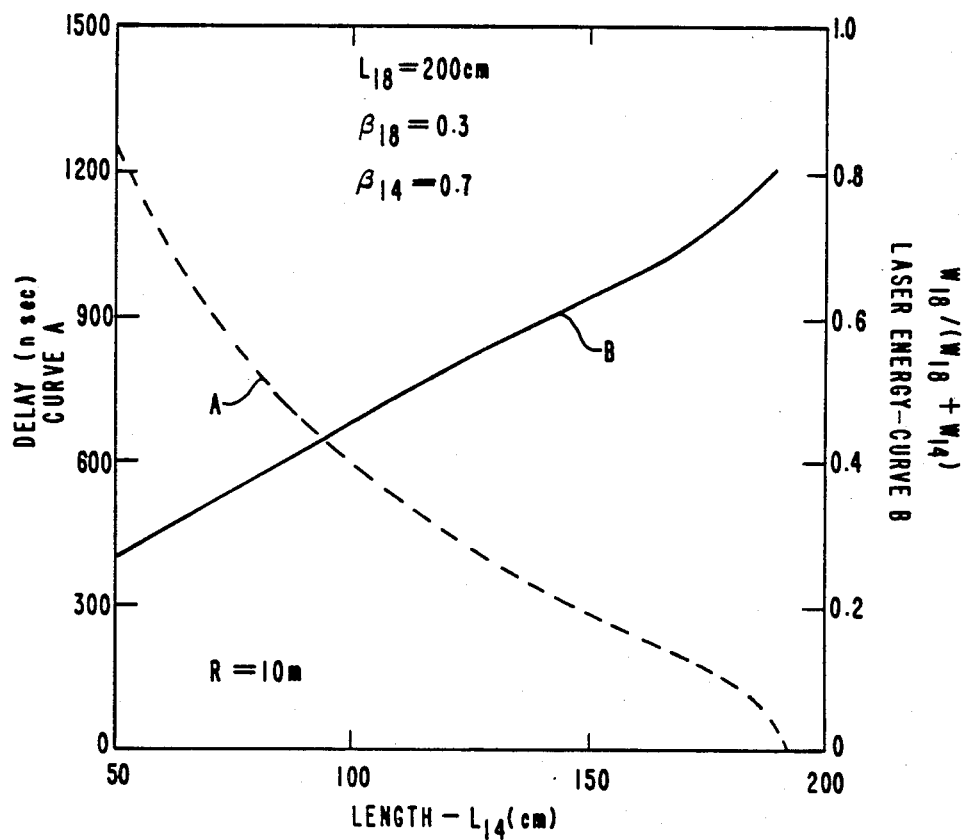
Figure 6:
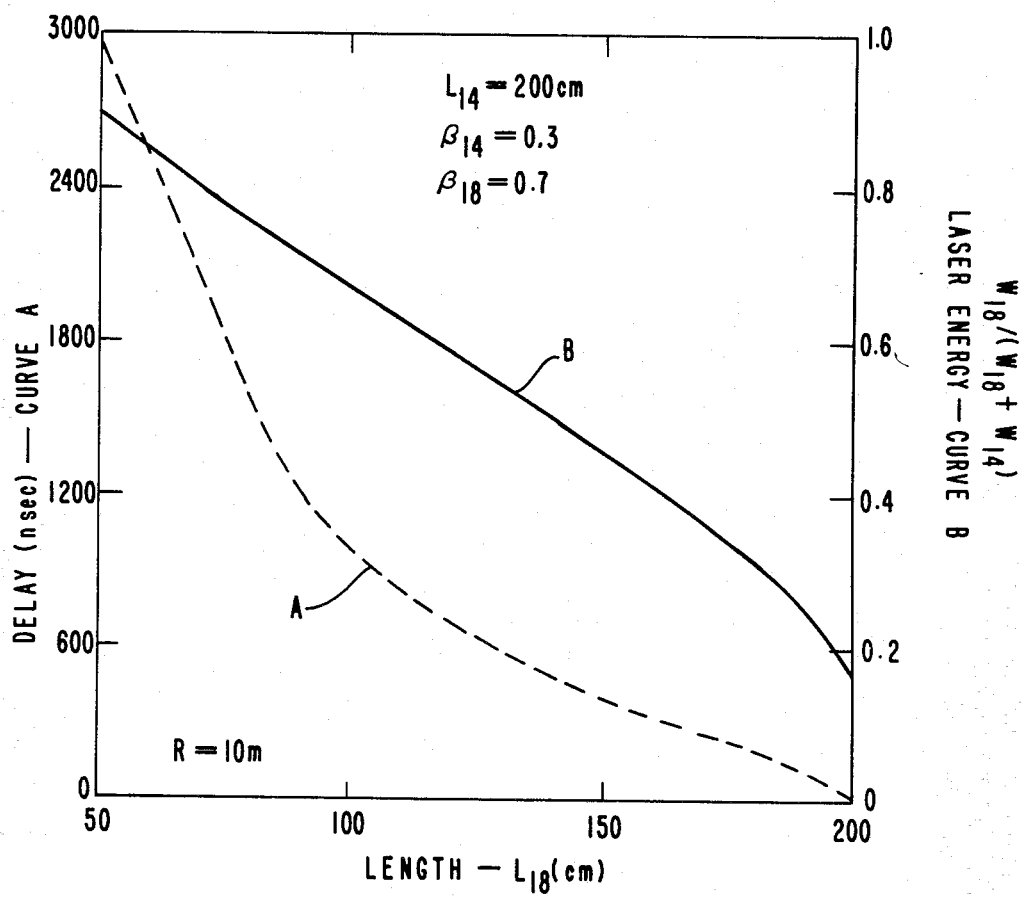

In addition to the influence of cavity lengths, the losses in the individual paths can also affect the energy division. By having a relatively short cavity length with high losses, it is possible to produce an initial pulse which drains only a fraction of the total population, leaving sufficient population to gain switch a succeeding pulse. As shown theoretically in FIGS. 3 and 4, the pulses associated with the wavelengths P(14) and P(18) can be clearly separated in time with the timing between the pulses determined by the cavity lengths. The energy loss is also less dependent upon the length since the high loss in the shorter cavity will help limit the energy transferred out of the shorter cavity. These effects are illustrated theoretically in FIGS. 5 and 6, where the time delay and energy divisions are plotted as a function of the path length.

It should be noted that the time delay can be varied over a wide range with a relatively small effect on the energy division. Furthermore, it is noted that either the pulse associated with the wavelength P(14), or the pulse associated with the wavelength P(18), can be delayed, regardless of the fact that the P(18) gain at a given point in the gain medium is always slightly higher than that of the P(14) wavelength.

The above technique has numerous practical uses in applications requiring multiple wavelengths and rapid switching capabilities.

I claim:

1. In a laser apparatus having a single laser gain medium and operating in a pulsed mode, the combination of:
   optical elements disposed relative to said single laser gain medium to produce two or more wavelengths from said single laser gain medium,
   said optical elements including first and second mirror means, and a grating element, said first mirror means being a totally reflecting mirror, said second mirror means being two or more partially reflecting mirrors, said grating element cooperating with said first mirror means through said single laser gain medium to define separate optical paths between said first and second mirror means, each path corresponding to a separate wavelength;
   said partially reflecting mirrors being positioned with respect to said grating element to establish path lengths for the optical paths of the respective wavelengths such that each wavelength exhibits a predetermined temporal spacing, pulse width and/or pulse energy.

2. A method of producing two or more wavelengths, each with a predetermined temporal spacing, pulse width and/or pulse energy, from a single laser gain medium of a laser apparatus operating in a pulsed mode and including optical elements comprised of first and second mirror means, and a grating element, said first mirror means being a totally reflecting mirror, said second mirror means being two or more partially reflecting mirrors, comprising the steps of:
   positioning said grating element relative to said first and second mirror means to define separate optical paths between said first and second mirror means within said single laser gain medium to define separate optical paths between said first and second mirror means, each path corresponding to a separate wavelength in said single laser gain medium; and
   varying the position of said first and second mirror means to define the lengths of said optical paths in order to produce the predetermined temporal spacings, pulse widths and/or pulse energies of the respective wavelengths.

3. A method as claimed in claim 2 wherein a lower gain line corresponding to one optical path builds up first, followed by the build up of a higher gain line corresponding to a second optical path, the build up of the higher gain line terminating the lower gain line through gain saturation.

* * * * *